(12) United States Patent
Bukai

(10) Patent No.: US 9,372,976 B2
(45) Date of Patent: *Jun. 21, 2016

(54) AUTOMATIC LEARNING MULTI-MODAL FRAUD PREVENTION (LMFP) SYSTEM

(71) Applicant: Dror Bukai, Caesarea (IL)

(72) Inventor: Dror Bukai, Caesarea (IL)

(*) Notice: Subject to any disclaimer, the term of this patent is extended or adjusted under 35 U.S.C. 154(b) by 0 days.

This patent is subject to a terminal disclaimer.

(21) Appl. No.: 14/220,407

(22) Filed: Mar. 20, 2014

(65) Prior Publication Data

US 2014/0289867 A1 Sep. 25, 2014

Related U.S. Application Data

(60) Provisional application No. 61/803,463, filed on Mar. 20, 2013.

(51) Int. Cl.
*G06F 7/04* (2006.01)
*G06F 21/32* (2013.01)
*G06F 21/44* (2013.01)
*G06Q 20/40* (2012.01)

(52) U.S. Cl.
CPC .............. *G06F 21/32* (2013.01); *G06F 21/44* (2013.01); *G06Q 20/4016* (2013.01)

(58) Field of Classification Search
CPC ... H04L 9/3247; H04L 9/3249; H04L 9/3252; H04L 9/3281
See application file for complete search history.

(56) References Cited

U.S. PATENT DOCUMENTS

| 6,553,494 B1* | 4/2003 | Glass .......................... 713/186 |
| 6,853,729 B1* | 2/2005 | Mizikovsky .................. 380/249 |
| 7,624,277 B1* | 11/2009 | Simard et al. ................ 713/182 |
| 2005/0120201 A1* | 6/2005 | Benaloh .................. G06F 21/31 713/155 |
| 2006/0174126 A1* | 8/2006 | Crandall et al. ............. 713/176 |
| 2007/0083763 A1* | 4/2007 | Itoh et al. ..................... 713/176 |

* cited by examiner

*Primary Examiner* — Esther B Henderson
(74) *Attorney, Agent, or Firm* — Carrie Stroup

(57) ABSTRACT

A computerized learning multi-modal fraud prevention system and method for generating a data signature of a user, such as one engaged in electronic commerce, to prevent fraudulent activities by machines and persons imitating the user. Steps comprise: fetching a signal of a user's signature stored in memory; generating at least one challenge sequence based on the signal to create a second signature; presenting the generated challenge sequence to the user; collecting the user's challenge response to the generated challenge sequence; computing a quality factor between the user's challenge response and the generated challenge sequence; computing a transaction quality factor and content quality factor and reporting an impostor or re-challenging if the quality factor is below a threshold. Lastly, generating a new signature based on any portion of a user's challenge response and/or any portion of the previously generated signature and/or any portion of collectable information from the user's device memory.

19 Claims, 4 Drawing Sheets

AUTOMATIC LEARNING MULTI-MODAL FRAUD PREVENTION (LMFP) SYSTEM

PRIORITY CLAIM

This application claims priority to U.S. Provisional Application 61/803,463 filed Mar. 20, 2013, by Dror Bukai, the entire disclosure of which is hereby incorporated herein.

FIELD OF THE INVENTION

Embodiments of the invention relate, in general, to the field of eCommerce Fraud Prevention (EFP), and more particularly to a use of an automatic learning multi-modal forensics system for EFP in order to rebut persons or programs masquerading as another by falsifying data. Automatic learning EFP assesses risk and "red-flags" probable fraudulent online transactions to allow for fraudulent transaction rejection and further analysis.

BACKGROUND OF THE INVENTION

The field of EFP has become increasingly important in today's society. Hundreds of millions of online transactions take place every day. Cyber criminals, such as impostors, purchase goods at virtual stores using stolen credit card information and still merchandise that amounts to humongous dollar value. eCommerce is the purchasing of products and/or services over the Internet through an electronic computing device, such as a desktop computer, a laptop, a tablet, a mobile phone, etc. But it requires conveying content to viewers through a device's screen display and allowing interaction with the content through the device, which is not a completely secure method for a financial transaction. eCommerce lacks effective means to combat impostors.

EFP plays a significant role in providing buyers intuitive means to assist in combating fraud. Automatic learning multi-modal EFP (LMFP) helps challenge impostors by putting smart obstacles in their way. The LMFP system responds to those smart obstacles from legitimate buyers and impostors, and tells merchants which electronic transactions are risky. By doing so, the LMFP system promotes trust in eCommerce which may lead to commerce growth. Buyers' confidence in merchants will grow knowing merchants are doing everything commercially possible to protect their purchases. Merchants will attract more buyers and grow their revenue because they will become trusted entities in the process. Credit card clearing and processing companies will prefer trusted merchants that use the LMFP system to minimize their fraud exposure.

State-of-the-art online fraud prevention utilizes various methods to identify impostors (either persons or machines) and botnets by detecting suspicious behavior, end devices, and/or channels through which transactions are made. One such innovative approach to detect fraudulent use of credit card information by impostors is by deep inspection of the transaction originating device and comparing it to a signature of the device. The learning multi-modal fraud prevention (LMFP) system goes beyond the state-of-the-art solutions by challenging buyers with sophisticated challenge sequences of objects, characters, numbers, words, phrases, sentences and any combination thereof, that require the buyer to respond by one or more of buyer's authentication data. Over time, the LMFP system learns to detect impostors by finding mismatches between legitimate and non-legitimate behavior. The state-of-art is based on an assumption that legitimate purchases are made through legitimate machines. The LMFP system also stores a signature for each user that is updated on a recurring basis (e.g. every time the user contacts or interacts with the LMFP system; every time an external application contacts or interacts with the LMFP system; on a predefined time schedule; when time laps since the last interaction between the user and the LMFP system is longer than anticipated; and/or, whenever an event occurs—such as when a charger is connected, a Bluetooth device is detected and/or connected, a wireless network such as wi-fi or cellular or wireline network is detected and/or connected, every time a phone call ends, a web browser session is started, and/or an application is launched, etc.), thus further hindering identity theft of the user.

One problem with the state-of-the-art solutions is their inability to assess correctly if a person is impersonating another person. By contrast, a LMFP system presents unparalleled opportunity to assess buyer authenticity correctly.

Identity verification has advanced in recent years, but little progress was made in developing countermeasures to protect it from the threat of spoofing, phishing, man-in-the-middle and replay attacks, otherwise referred to as imposture attacks. Automated, unattended identity verification systems (e.g. eCommerce fraud prevention systems) are particularly vulnerable to spoofing, falsification or impersonation of a biometric trait attacks. Examples of spoofing include impersonation, replay attacks, voice conversion and speech synthesis. The LMFP system counters the vulnerabilities of identity verification systems through a moving target defense mechanism. The LMFP system challenges users with a one-time-challenge sequence that does not repeat itself ever again for any specific user and analyses a user's response against this one-time-challenge. A so-called replay attack, where a genuine user recording is replayed to a verification sensor, such as a microphone, is blocked by the LMFP system after the validity of the original recording has expired. Therefore, it is impossible to overcome the LMFP system moving target defense after the expiration time through the replaying of a user identification signal. Even if a counterfeit sensor tricks a user into disclosing their data signature (i.e. phishing), that data signature is irrelevant for future use by impostors.

The LMFP moving target defense system ensures that identity is valid for a short configurable period of time. A few seconds (parameter) after a challenge sequence had been generated and presented to the user, it becomes obsolete. A person's data signature is constantly changing every time that the person interacts with the LMFP system, and/or an external application interacts with the LMFP system and/or with that person, such as at the beginning and/or end of every phone call that the person makes or receives and/or the person's location changes. A person gets scores that strengthen the trust factor of its identity every time there is strong correlation between data signature and the collected data, such as arriving at a known work office or home location, calling a home or office of family and friends members, etc. A person's identity trust factor deteriorates when there is not enough fresh supportive data of that person's identity for a certain time period (e.g. didn't arrive to the office as usual, didn't respond to a challenge sequence during the past hour, etc.). External applications may conduct risk assessment and decide if the LMFP trust factor is sufficient to fulfill an action and if not, they may trigger a challenge sequence to revamp the trust factor of that person to allow fulfillment, (e,g, approve an eCommerce transaction). Different levels of the LMFP trust factor may be associated with different identity persona (e.g. social networking persona, financial transactions monitoring persona, funds transfer persona, etc.). Applications may provide the LMFP system with policy and rules defining required trust levels for each persona. The LMFP system is different from the state-of-the-art identity verification methods by being dynamic and active and quasi-continuous. Instead of passively trying to assess identity authenticity during a transaction, the LMFP system is continuously trying to assess identity authenticity. This approach may yield less friction with users during transactions (e.g. a person with a high enough trust factor may use one-click checkout without typing in any identifying or credit card information). This approach may yield lower shopping cart abandonment rates and thus, foster business growth and better commerce. The proactive and dynamic and continuous identity authentication of the LMFP system prevents impersonation and combats identity related cybercrimes and promotes a more secure and clean Internet than the prior art.

SUMMARY OF THE INVENTION

The various embodiments of the present invention comprise computerized LMFP processes, such as: pattern analytics and recognition; pattern generation; pattern generation in correlation with pattern analytics; and so forth. LMFP processes require computational analytics by a computer processor of one or more of the following user's (e.g. buyer's) authentication-identification data (i.e. buyer data), and any combination thereof. Examples of user's or buyer's authentication data may comprise: 1) a buyer's voice live or recorded; 2) a still picture, a motion picture, and/or a video displaying a buyer's face, object, or item; 3) a still picture or scan of a buyer's optical iris and/or eye veins; and/or, 4) a still picture or scan of a user's finger(s) and/or palm. An object can be a referenced thing, an item can be a further enumerated (one of a collection) of a referenced thing (e.g. a sub-group). Examples for a buyer's object include a buyer's pen, shirt, shoe, bag, front teeth, etc. Examples for a buyer's item include a buyer's book read last month, the second buyer's book from the left in a picture, etc.

Pattern Analytics

The present invention comprises LMFP pattern analytics of buyer data associated with a specific purchasing entity (e.g. a known buyer), such as a person, a trusted group of persons, and/or a business. The buyer data represents at least one online buyer who controls a transaction through a web page of a virtual store, i.e. a known buyer, who may interact with a point-of-sale device and/or program and be recognized as such in one embodiment of the invention. The interaction of a known buyer at a point-of-sale may serve as a learning phase of the LMFP system of the known buyer to develop their data signatures. A "data signature" is an adaptive, infinitesimally unique pattern associated with a buyer based on historical data and current challenge sequence; and, they are dynamic by nature, contrary to a classic meaning of a signature. A plurality of buyer data sets (from more than one buyer) may be used by the LMFP system to generate multiple data signatures that each correlate with the same content, say YY. Likewise, data signatures of a specific entity may comprise multiple signatures each correlated with different content, say YY, ZZ, AA, BB, etc.

Buyer data signature is known buyer dependent—meaning the signature is an infinitesimally unique pattern associated with a buyer at a certain moment. The signature may be content dependent, or content independent. Furthermore, the signature of a buyer for content, say YY, may change with time, wherein the buyer's record stored within the LMFP system will be updated accordingly. One embodiment of the invention encompasses content independent voice pattern analysis and signature matching. Another embodiment of the invention encompasses content dependent voice pattern analysis and signature matching. Another embodiment of the invention encompasses both content independent and content dependent signature matching in tandem.

Quality Factor

Tandem processing may improve the false reject ratio and the false accept ratio, enabling buyer data pattern analysis to generate an optimal quality factor for the transaction. By way of example, the tendering may be launched to shorten processing time and system resources by first running short time processes that are less demanding in system resources (e.g. processing and memory) utilization and then deploying more demanding algorithms only for those transactions in question where a quality factor is below a threshold.

And the content dependent and content independent signatures matching buyer data pattern analysis may be deployed in parallel in cases of available resources. By way of example, such parallel processing may be performed for selected high risk transactions.

One embodiment of the invention applies a quality factor to buyer data signature matching process output that may use at least one signature matching quality factor to generate a trust factor and/or a transaction quality factor. The trust factor and/or transaction quality factor may become instrumental in a decision to accept or reject an online transaction. The trust factor represents a quasi-continuous or a temporal level of authenticity of identity. According to one embodiment of the invention, a certain trust factor level is associated with identity persona. According to one embodiment of the invention, the transaction quality factor is a manifestation of a trust factor to external applications. According to one embodiment of the invention, the transaction quality factor may be used in buyer data pattern generation.

Challenge Pattern Generation

Buyer data pattern generator may encompass challenge pattern generation that is derived from a known buyer authentication data signature (e.g. voice and/or still picture of and/or motion picture of and/or a video of a face and/or an object or objects or items and/or picture/or scan of iris or a finger or fingers or palm signature). By way of example, the LMFP system may hold a buyer data signature of a person XX who spoke the word YY, thus the buyer data pattern generator which can generate buyer data phrases ZZ and BB, may generate a challenge pattern of the form ZZYYBB and a challenge YYZZBB. One embodiment of the invention encompasses a pseudo random challenge sequence, such as one presented to a buyer on a purchasing web store page or by playback of the challenge sequence to earphones or loudspeakers. The buyer would be instructed to react to the challenge in a specific way (e.g. "please say YYZZBB" or "please look at your device's video camera, after you hear a beep, perform the following YYZZBB facial expressions: wink left eye then wink right and then look strait and smile until you hear a double beep", or "please take a picture of your face after the beep, then say your mother's maiden name then say BB" or "please say the name of your first dog, then say the name of your spouse's mother and then point your device's camera to take a picture of your shoes", or "say red, red, yellow, yellow, green, green" where the LMFP system is actually expecting YYZZBB answer which the user needs to deduce or remember when applying the response to be "Tomatoes, Oranges, Trees"), and the LMFP system would analyze the challenge response content and buyer's data signature for authenticity based upon their stored data YY.

One embodiment of the invention encompasses an outbound calling application interface. The interface allows for outbound calling to buyer specified phone numbers. By way of example, the buyer answers a call on his mobile phone and speaks a challenge sequence back to the LMFP system.

One embodiment of the invention encompasses random length silence generator to generate a challenge sequence of spoken content with random length silence periods embedded in it.

One embodiment of the invention encompasses a mechanism to embed objects within challenge sequences. By way of example, an object is a picture or an image, such as an image of a cat that is inserted into the challenge sequence YYZZBB. The buyer must react to the YYZZBB challenge phrase in a specified way and identify the object. By way of example, an object is a picture or an image, such as an image of a cloth article (e,g, a shirt) or accessory (e,g, a watch or a ring) that is inserted into the challenge sequence YYZZBB. The buyer must react to the YYZZBB challenge phrase in a specified way and identify the object (e,g, I am wearing that ring and this shirt and not those shoes). Additionally, or alternatively, the object is an image containing text that is hard to read by machines. Additionally, or alternatively, the object is a video clip that may make content impossible to read by machines. Additionally, or alternatively, the object is an animation and/or an advertisement. The advertisement may be of any audio-visual format that fits user/buyer environment such as a computer screen and speakers. The challenge sequence may comprise a visual effect of a display, such as it changes color of the display background, and the buyer must identify what the color change is in addition to the repeating the challenge.

Buyer Response Sequence

The buyer needs to react to the challenge sequence by speaking through a microphone and/or performing in front of a camera and/or using input devices such as a pointing device (e,g, a mouse) and keyboard (herein 'response sequence'). By way of example, buyer XX says their response sequence by repeating the challenge sequence YYZZBB. By way of example, buyer XX says their response sequence by repeating the challenge sequence YY waiting TT time, then saying content ZZ, then waiting another PP time, and then saying phrase BB. By way of example, buyer XX says their response sequence by repeating the challenge sequence YY, waiting TT time, then saying CAT (content object is an image), then waiting another PP time, and then saying phrase BB. This implementation of multi-modal challenge sequence generation increases the probability of combating machines and programs that are attempting to impersonate the buyer.

The response sequence is converted to a digital representation of a media signal such as, but not limited to speech, video and/or image signal, that is recorded or stored permanently or temporarily until after it has been processed. One embodiment of the invention encompasses media signal features extraction. The features may correlate with previously recorded buyer data signatures. By way of example, the recorded media signal is transferred to buyer data pattern analysis, which performs truncation of the recorded buyer data pattern. By way of example, the buyer data pattern analysis performs isolation of the recorded signatures in the buyer data pattern. By way of example, the buyer data pattern analysis performs order matching between the recorded and the generated buyer data pattern. By way of example, the buyer data pattern analysis generates a non-match quality signal in cases where the generator challenge sequence does not match the order of the buyer's response sequence. For example, say ZZTTYYPPBB does not match the order of the response sequence (recorded buyer data pattern), say YYTZZPPP-PBB. By way of example, the content independent buyer data pattern matching may yield a non-match signal prior to buyer data truncation, and/or prior to the order matching.

One embodiment of the invention encompasses generation of the non-matching signal to alert that a possible impostor of a transaction is a machine. One embodiment of the invention encompasses generation of the non-matching signal to alert that a possible impostor of a transaction is a person impersonating a known buyer.

Encryption

Another embodiment of the invention encompasses a direct sequence generator in conjunction with a buyer data pattern analysis. By way of example, the recorded buyer data signature is mixed with a secret direct sequence signal to encrypt it prior to storage. Another embodiment of the invention encompasses an encryption key generator in conjunction with a buyer data pattern analysis. By way of example, the recorded buyer data signature is encrypted prior to storage. By way of example, the encrypted buyer data signature can be reconstructed for matching by utilizing a pair key or mixing it with the direct sequence again.

One embodiment of the invention encompasses at least one encryption mechanism to disable synthesis of buyer data signatures by machines. By way of example, machines are not able to economically generate a buyer data signature signal mixed with a direct sequence signal which resembles white noise. One embodiment of the invention encompasses means of a buyer data pattern analysis to mix the generating direct sequence with recorded signals. By way of example, the mixing and analysis produces a buyer data signature similar to the encrypted signature. By way of example, the encryption decryption mechanisms are managed to insure security of buyer's authentication data signatures stored in the data bank and to combat spoofing and/or alterations.

Collection of Buyers' Signatures (Human and Machine)

One embodiment of the invention encompasses creating a collection of a plurality of buyer identification signatures of each known buyer over time. By way of example, the buyer visits a virtual store for the first time. The LMFP system challenges this person with a sequence. The buyer responds to the challenge sequence into the LMFP system through a microphone and/or a camera and/or some other input devices such as a keyboard. The response sequence's signal is possibly recorded and transmitted to LMFP system for pattern analysis. No feedback signal or quality factor may be generated by the analysis at that time since there is no buyer identification data signature to compare it to. Pattern analysis may extract and record features of the first signature and may generate a quality signal to notify a merchant or hosting program of a first time buyer that allows the merchant to minimize their risk by limiting transaction magnitude or trigger other means to ensure that the first time buyer is not an impostor.

One embodiment of the invention encompasses a buyer stress analysis mechanism which may generate quality factors to trigger further risk assessment if buyer shows fear and/or stress characteristics reflected in the response sequence.

Machine: One embodiment of the invention encompasses re-challenging mechanism to combat a first time machine masquerading as a first time buyer through random sequencing of challenges. By way of example, if a machine or a program impersonates a first time buyer, it will be rebutted with one or more random sequences that are impossible or hard to deceive the LMFP system during the buyer's authentication data pattern analysis.

Bookkeeping Mechanism

One embodiment of the invention encompasses a bookkeeping mechanism to allow for an audit trail for all transactions in accordance with laws applicable to merchants' financial transactions. One embodiment of the inventions encompasses a unique identification mechanism of each transaction and each buyer data signature associated with the transaction. By way of example, the identification is encrypted. By way of example, the identification is scrambled to make it impossible to associate information to a person without a proper deciphering mechanism.

Feedback Mechanism

One embodiment of the invention encompasses a feedback mechanism to allow for reclassification of a buyer recorded data (i.e. a buyer's specific authentication data signature) from a specific transaction to label it as fraudulent.

By way of example, if a first time buyer recorded data signature is made by an impostor, be it a person, a program or a machine, and if pattern analysis of this signature failed to flag the transaction as risky, and the buyer recorded data was saved as a first time buyer signature in a "WhiteList", then the LMFP system allows for post mortem reclassification of the buyer signature as fraudulent and clears it from the white-list of valid signatures.

Another embodiment of the invention encompasses a "BlackList" wherein a mechanism compares received buyer recorded data signatures to fraudulent signatures in the bank. Blacklist matching may be employed in parallel with buyer data pattern analysis matching to good, known buyer data signatures of the WhiteList in order to increase system performance. The "BlackList" search mechanism may be employed in tandem to a "WhiteList" matching to improve LMFP system performance, especially in certain cases of marginal WhiteList quality factor, or if the system data processing and memory resources permit.

Noise Reduction Mechanism

One embodiment of the invention encompasses a noise reduction mechanism comprising the cleaning and normalization of buyer data recordings prior to features extraction and buyer data pattern analysis. By way of non-limiting examples, the noise refers to one or more of the following: background noise; ambient noise; buyer data channel noise; and, human physiological noise (i.e. buyer data imperfections as a result of buyer illness, fatigue, hoarseness, etc.).

Performance Analytics

One embodiment of the invention encompasses a means to record a transaction source device's unique parameters in association with the recorded buyer data signature. An embodiment of the invention encompasses a performance analytics mechanism. By way of example, the performance analysis comprises a quality factor analysis. The analysis may involve analysis of any number of elements of a transaction, such as the source device, the originating territory and the communications characteristics. The quality factor analysis enables examination of buyer data signatures changes over time. By way of example, the analysis over time allows for identification of quality deterioration or fluctuations between consecutive transactions. One embodiment of the invention encompasses a quality signal generation that spans a plurality of consecutive transactions.

One embodiment of the invention encompasses means to report quality factor behavior at any specific time window. By way of example, the report may be produced for any specified user/buyer or for any specified group parameters. By way of example, the report may be produced for a territory. By way of example, the report may assist in detecting fraud attacks that originated at a specific territory. By way of example, the report may be produced for a specific source device, say a specific mobile phone.

Buyer Analysis

The LMFP system is directed to the problem of fraudulent electronic commerce transaction risk assessment by way of integration of, but not limited to, at least one of the following user/buyer related public information elements: user/buyer information posted in public records such as social networks, and/or published in public records such as blogs, and/or published in public records such as social media, and/or shared by a user/buyer onto the LMFP system through forms, and/or shared by a user/buyer onto the LMFP system through interactive questions and answers sessions, and/or shared by a user/buyer onto the LMFP system through challenge responses, and/or submitted onto the LMFP system through customer service representatives.

An embodiment of the invention encompasses an events correlation mechanism that checks for use abnormalities of a user/buyer. By way of a non-limiting examples, the correlation mechanism checks if a user/buyer posts in a social network while the user/buyer is in an LMFP process (e.g. submitting a response sequence to the LMFP system). And/or, the correlation mechanism checks if a user/buyer posts at a physical location while the user/buyer is in the LMFP process that is originating from another location. And/or, the location can be extracted from a user/buyer mobile phone. And/or, the location can be a specific region extracted from a user/buyer originating IP address. And/or, the correlation mechanism checks a user's spouse's name and location from public or LMFP records in comparison with the user's responses to LMFP challenge question. And/or, the correlation mechanism checks one or more of the following: the time length of a transaction, repetition of visiting a transaction, time lapse between repeated transaction, distribution of transaction locations, speed of movement within the same transaction location area, and speed of movement between different transaction location areas. And/or, the correlation mechanism assess a user/buyer's authenticity based on changes in one or more of the correlation elements over time, from the time prior to the transaction through the time the transaction is no longer processed.

One embodiment of the invention encompasses analysis of buyer interest in content presented to him. By way of non-limiting examples, the LMFP system assesses a buyer's interest in content through a movie timeline by any number of the features analysis elements. And/or, the LMFP system analytics assesses a buyer's interest in an advertisement located within a movie. And/or, the LMFP system analytics assesses a buyer's interest in an advertisement located within an animation. And/or, the LMFP system analytics assesses a buyer's interest in an advertisement located within an image. And/or, the LMFP system analytics assesses a buyer's interest in an advertisement located within a full screen display of any number of content elements. And/or, the LMFP system analytics assesses a buyer's interest through statistical analysis of at least one analysis element.

The LMFP system analytics may integrate analysis elements from any available information about a buyer in order to assess buyer interest. By way of non-limiting examples, the LMFP system analytics may integrate with the analysis elements a buyer gender. And/or, the analytics may integrate with the analysis elements a buyer location. And/or, the analytics may assess based on analysis elements and a buyer's gender and a buyer's location that the buyer is interested in a nearby women's hair salon.

An embodiment of the invention utilizes analytics based on data collected for one anonymous buyer. Another embodiment of the invention utilizes analytics based on data collected for one specific buyer. Another embodiment of the invention utilizes analytics based on data collected for a plurality of anonymous buyers. Another embodiment of the invention utilizes analytics based on data collected for a plurality of specific buyers. By way of non-limiting examples, a plurality of specific buyers may be known by at least one identifying information, such as gender, email address, etc.

Content Quality Factor

An embodiment of the invention utilizes analytics to calculate a content quality factor. Content quality factor may be a multi-dimensional array of content quality factors. By way of non-limiting examples, a content quality factor may rank adequacy of content for a specific buyer gender. And/or, a content quality factor may rank adequacy of content for a specific buyer age, a content quality factor may rank adequacy of content for a specific buyer identification. And/or, a content quality factor may rank adequacy of content for a specific buyer name. And/or, a content quality factor may rank monetary value of content. And/or, a content quality factor may rank keywords that represent content.

An embodiment of the invention makes the content quality factor available in real-time for at least one buyer interest assessment. By way of example, advertisement may be served based on the quality factor in real-time to the buyer.

An embodiment of the invention makes the content quality factor available in real-time for controlling of content presented to the buyer. By way of non-limiting examples, content presented to a buyer, not necessarily a challenge sequence, may be correlated with content quality factor—such as a keyword rank. And/or, the controlling of content may include replacing the content presented to buyer. And/or, the controlling may include changing parameters of content presented to a buyer, such as color. And/or, the controlling may include changing parameters of the content presented to a buyer, such as background color. And/or, the controlling may include changing parameters of content presented to a buyer, such as the content order in a sequence of content elements.

In one exemplification, a buyer reacts to a movie of a singer in a manner (e.g. vocally and/or facially and/or by gestures and/or by signaling of any kind) that may be captured by a device (e.g. a camera and/or a video camera and/or by a microphone and/or through an input device such as a digital pen and/or a touch screen and/or a keyboard and/or a mouse and/or a pointing device). The LMFP system analytics then generates a content quality factor array of any order, ranking the singer as favorable to the buyer. The LMFP system then controls the content presented to the buyer by presenting the buyer advertisements related to the singer, such as a discount coupon for singer performance in vicinity to the buyer location. By way of non-limiting examples, the advertisement is presented immediately after the buyer saw the movie challenge sequence. And/or, the advertisement may be presented after the buyer navigated to another web page. And/or, the advertisement may be presented after the buyer logged onto the buyer computer in another occasion. And/or, the advertisement may be presented after the buyer logged onto any web page and/or application which has access to and/or relation with the LMFP system through any network connected device at any location. The network connected device may be, for example, a computer connected to the internet at an Internet cafe.

Analytics data, and the analytics content quality factor, may be stored and retrieved for further analysis.

Buyer's Device: An embodiment of the invention utilizes analytics on a device co-located with a buyer. By way of non-limiting examples, the co-located device may comprise a mobile phone; a desktop computer; a tablet computer; a hybrid computer and phone such as phablet, phone and tablet; and/or, a wearable computer such as, but not limited to, Google® glasses.

Another embodiment of the invention utilizes analytics on a computing device dislocated from a buyer. By way of example, the dislocated computing device may comprise a cloud computing platform.

Another embodiment of the invention utilizes analytics on multiple computing devices partially co-located with a buyer and partially dislocated from a buyer.

Analytics may be performed in real-time. By way of example, an advertisement of a product related to a specific content may be presented to a buyer in response to a content quality factor generation in real-time.

Analytics may be performed off-line. By way of example, a content quality factor may be generated based on statistical analysis over a period of time. By way of example, women react to advertisements with kids more passionately than men by a factor of two.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION

Glossary of Terms

As used herein, the term "buyer's authentication data" refers to one or more of the following user's data: a user's voice live or recorded; a still picture, a motion picture, and/or a video displaying a user's face, object, or item; a still picture or scan of a user's optical iris; and/or, a still picture or scan of a user's finger(s) and/or palm. This data may be recorded or generated.

As used herein, the term "user and/or buyer identifying information" refers to user/buyer contact information and/or id number and/or passport number and/or driver license number and/or email address and/or pictures and/or videos from social networks such as Facebook® and/or LinkedIn® and/or Google+® and/or Picasa® and/or voice recordings from message center such as answering machine, or the like.

As used herein, the term "signature" refers to an adaptive, infinitesimally unique pattern associated with a buyer based on historical data and current challenge sequence. Signatures are dynamic by nature, contrary to a classic meaning of a signature.

System Architecture

Figure 1:
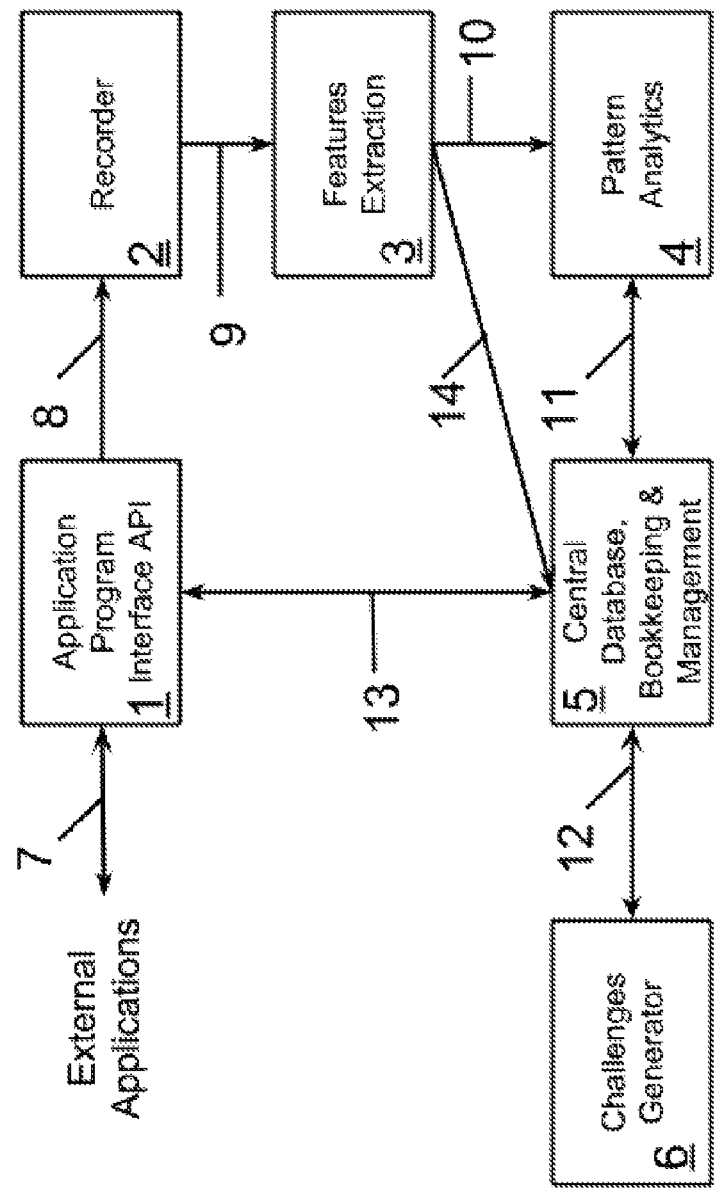
FIG. 1 is a block diagram of an automatic learning multimodal fraud prevention system in accordance with one embodiment of the present invention.

FIG. 1 is a block diagram of an automatic learning multimodal fraud prevention (LMFP) system in accordance with one embodiment of the present invention, comprising an application program interface (API) (Block 1); a recorder (Block 2); a features extraction (Block 3); a pattern analytics (Block 4); a central database storing bookkeeping and management data (Block 5); a challenge generator (Block 6); and one or more external applications (Block 7).

Block 1 represents a means for interfacing with external programs for collecting at least one signal of buyer identification information, and buyer response.

One embodiment of the invention encompasses a mechanism or a program that crawls web pages and collects user/buyer related identifying information such as, but not limited to, user/buyer contact information and/or id number and/or passport number and/or driver license number and/or email address and/or pictures and/or videos from social networks such as Facebook® and/or LinkedIn® and/or Google+® and/or Picasa® and/or voice recordings from a message center such as answering machine. The crawler may comprise an API to integrate with such social networks to collect the media or picture files. The information may also include a time stamp and buyer id and location.

Block 1 collects through connection 7, user/buyer identification information from at least one of, but not limited to, a virtual web store, web page, web application, mobile application, search engine such as Google® and/or Bing®, social networks such as Facebook® and/or LinkedIn@ and/or Wikipedia®, Ad Server, CRM Server, End-User Device such as desktop computer, laptop computer, tablet computer, mobile phone and/or combinations thereof. An embodiment of the invention corresponds to Block 1 collecting source device unique parameters, such as: a user/buyer gender; a location; and, a buyer's authentication data.

Block 5 (e.g. a local or remote server) may convey to Block 1 through connection 13 control signals to assist Block 1 in collecting the information. For example, Block 5 triggers a collection by Block 1 from social networks or through a search engine API and a specific search pattern such as "<search web for "user full name>" and/or "<search web for "user email address">". For example, Block 1 may comprise a Java Script or a Flash Client program or a widget and/or html5 program or similar code, embedded into a web page and/or an application of a merchant or serving a merchant or serving a point of sale program and/or device of or serving a merchant or a retailer or a wholesaler through which a user/buyer purchases goods on the Internet or through other remote connectivity infrastructure, such as but not limited to a cellular network infrastructure or a local area network or a wide area network or at a point-of-sale. For example, Block 1 may be fully co-located with buyer or distributed in part, co-located with user/buyer web client and/or dislocated from user/buyer web client onto a remote server or servers at a hosting facility and/or in the cloud.

An embodiment of the invention corresponds to Block 1 conveying to Block 2 through connection 8, a buyer's authentication data signals and associated user/buyer identification information. An embodiment of the invention corresponds to anti-spoofing measures enforcement over at least connections 8, 9 and 13 by means of one or more, but not limited to the following measures: virtual private network connections, SSL connections, encryption, and scrambling. An embodiment of the invention corresponds to Block 2 recording of a buyer's authentication data signals of response or responses to challenge sequences. An embodiment of the invention corresponds to Block 2 associating recordings of buyer's authentication data signals with buyer identification information. An embodiment of the invention corresponds to Block 1 conveying to Block 5, through connection 13, any one of but not limited to, source device unique parameters, buyer's authentication data signals' attributes associated with buyer identification information for storage in database, management and bookkeeping of events and actions per each electronic transaction and each user/buyer. An embodiment of the invention corresponds to Block 1 employing buyer's authentication data activity detection techniques and conveying to Block 5 buyer's authentication data analysis parameters that may comprise, at least one of, but not be limited to the following measurement elements: time length of a buyer response to a challenge sequence, wait time between challenge sequence display and buyer response, time lapse between buyer's authentication data response end-time and followed action, speed of response to a newly presented content, velocity of response, rhythm of response, and tempo of response.

An embodiment of the invention corresponds to Block 2 being co-located with user/buyer web or application interface device. Another embodiment of the invention corresponds to Block 2 partially co-located with user/buyer web interface device and partially dislocated from user/buyer web interface device. Another embodiment of the invention corresponds to Block 2 completely dislocated from user/buyer web interface device, in the cloud or another server location. An embodiment of the invention corresponds to Block 2 generating a digital file that contains a lossless recording of a buyer's authentication data of response sequence. For example, the digital file of recorded buyer's authentication data may be a media file comprising: way, mp3, mp4, mpg, mpeg, fly, avi, wmv, jpeg, mjpeg, png, tiff, gif, bmp and alike other media files. For example, the digital file of a recorded buyer's authentication data is named using a unique identification of recorded buyer. For example, the digital recorded buyer's authentication data file's unique name is provided by Block 5 to Block 1 through connection 13 and through Block 1 to Block 2 through connection 8. For example, the digital recorded buyer's authentication data file's unique name is provided by Block 1 to Block 5 through connection 13 and to Block 2 through connection 8. An embodiment of the invention corresponds to Block 2 conveying to Block 3 through Connection 9 a buyer's authentication data recording. The buyer is the user of an electronic transaction of the merchant.

Block 3, Features Extraction, calculates the buyer's authentication data features and parameters that correspond to a buyer's unique characteristics, i.e. buyer's authentication data signature parameters. The LMFP system looks through Block 3 and Block 4 at a buyer's authentication data features, comprising for example: features with large variability between different buyers and small variability for the same buyer; features that are robust against noise and distortion; features that occur frequently and naturally in recorded media and are economical in time and resources to measure; and, features that are difficult to impersonate/mimic and that are not affected by a buyer's health or long-term variations (e.g. aging) in their buyer's authentication data. An embodiment of the invention corresponds to Block 3 calculating a buyer's authentication data features and parameters that correspond to a transaction unique characteristics.

Another embodiment of the invention corresponds to Block 3 comprising at least one buyer's authentication data filtering and analysis technique, including but not limited to, short-framing, pre-emphasizing, smoothing, fast Fourier transform (FFT, DFT), noise reduction or suppression, activity detection (VAD), dynamic adaptive separation of desired signal and noise, buyer's authentication data_ enhancement, segmentation, mel-frequency cepstral coefficients (MCC, MFCC), linear prediction cepstral coefficients (LPCC), line spectral frequencies, perceptual linear prediction (PLP), cepstral mean normalization (CMN), feature warping, Gaussianization, relative spectral filtering (RASTA), frequency estimation, short term spectral envelope i.e. timbre of sound, pitch detection, energy duration, rhythm, temporal features, glottal pulse shape and features and fundamental frequency, delta and double delta, amplitude modulation frequency, Temporal discrete cosine transform (TDCT), frequency demodulation (FM), prosodic fundamental frequency (F0), pause statistics, phone duration, speaking rate, energy distribution, energy modulation, hidden Markov models (HMM for text dependent), Gaussian mixture models (GMM), supervectors mapping (SVM), patterns matching, vector quantization, LMS, distance between lines and/or patterns and/or points or spots and/or features, contour analysis, principal components analysis, 3-D analysis, linear discriminant analysis, elastic bunch graph matching, multi-linear subspace learning, neural motivated dynamic link matching facial recognition, skin texture analysis, likelihood analysis, neural networks, fusion, score normalization and decision trees.

Another embodiment of the invention corresponds to Block 3 comprising at least one extraction capability of text dependent and text independent buyer's authentication data features. For example, text dependent buyer's authentication data features may include spoken words extraction and/or understanding of a reaction to text. For example, the understanding of reaction may include, but not be limited to extraction of body language and/or gestures and/or facial expressions.

An embodiment of the invention corresponds to Block 3 employing background audio and/or lighting model associated with: the transaction; the buyer; and/or the buyer data channel. For example, the channel may be, but not limited to a telephone, a wireless phone, a mobile phone, a phone camera of a certain quality, a computer attached camera or embedded camera of a certain technology such as a cmos camera or a 2 mega pixel camera or a 10 mega pixel camera, or a microphone connected to a computer, a microphone embedded in a computer such as a microphone of a cell phone, a specific type of a microphone such as ceramic.

An embodiment of the invention corresponds to Block 3 employing buyer's authentication data activity detection techniques and conveying to Block 5 through connection 14, buyer's authentication data analysis parameters that may comprise, but not be limited to, at least one of the following measurement elements: the text independent buyer dependent buyer's authentication data features; the text dependent buyer dependent buyer's authentication data features; the background model features; and, the time length of response to a challenge sequence, wait time between challenge sequence display and buyer measured response, time lapse between buyer's authentication data response end-time and followed action, speed of response to a newly presented content, velocity and/or rhythm of response.

An embodiment of the invention corresponds to Block 3 conveying to Block 4 through connection 10, the buyer's authentication data features and parameters of the buyer for further analysis. Another embodiment of the invention corresponds to Block 5 conveying to Block 4 through connection 11, the buyer's authentication data features and parameters of the buyer and the background model for further analysis.

Block 4 may comprise at least one but not limited to the following techniques for buyer's authentication data pattern analytics: mel-frequency cepstral coefficients analysis (MFCC), linear prediction cepstral coefficients analysis (LPCC), line spectral frequencies analysis, perceptual linear prediction analysis (PLP), cepstral mean normalization analysis (CMN), feature warping, Gaussianization, relative spectral filtering (RASTA), frequency estimation, short term spectral envelope analysis, pitch statistics, energy duration statistics, rhythm statistics, temporal features analysis, glottal pulse shape and features and fundamental frequency analysis, delta and double delta analysis, amplitude modulation frequency analysis, Temporal discrete cosine transform analysis (TDCT), frequency demodulation (FM) deviation analysis, prosodic fundamental frequency (F0) analysis, pause statistics, phone duration statistics, speaking rate statistics, energy distribution statistics, energy modulation statistics, hidden Markov models analysis (HMM), spoken words matching to challenge sequence, body language and/or gestures and/or facial expression matching to challenge sequence, Gaussian mixture models (GMM) analytics, supervectors mapping (SVM) analytics, patterns matching, vector quantization, LMS, distance between lines and/or patterns and/or points or spots and/or features, contour analysis, principal components analysis, 3-D analysis, linear discriminant analysis, elastic bunch graph matching, multi-linear subspace learning, neural motivated dynamic link matching facial recognition, skin texture analysis, likelihood analysis, neural networks, fusion, score normalization and decision trees, to generate decision quality factors.

Quality Factors:

The quality factors may be text and/or trigger dependent, and/or independent. For example, a trigger may be but not limited to an image and/or a movie and/or a sound. An embodiment of the invention encompasses Block 4 buyer stress analysis mechanism. For example, the stress analysis generates quality factors to trigger further risk assessment if a buyer shows fear and/or stress characteristics reflected in the response sequence. An embodiment of the invention corresponds to Block 3 and Block 4 comprised in part or as a whole of commercial off the shelf programs for buyer recognition. For example, a text independent buyer authentication tool kit, buyer's authentication data Grid™, by Speech Technology Center, may be used. For example, tools by Nuance may be used. For example, open source tools such as OpenBR face recognition may be used. For example, open source tools such as Google VoiceID speaker recognition may be used. An embodiment of the invention corresponds to Block 4 fetching buyer's authentication data signature history or reference data from Block 5 through connection 11. The information data may comprise any number of buyer's authentication data features data from whitelists and blacklists as might have been accumulated over time. The information data may comprise any number of buyer's authentication data features data of a background model. The information data may comprise any number of buyer's authentication data features data of media collection channel. The reference data is processed with newly created buyer's authentication data features analytics to generate the quality factors.

An embodiment of the invention corresponds to Block 4 fetching reference challenge sequence data from Block 5 through connection 11. The sequence data is processed against newly created buyer's authentication data features analytics to generate the quality factors. For example, Block 4, buyer's authentication data pattern analysis, performs order matching between the recorded buyer's authentication data pattern and the generated challenge sequence. For example, the buyer's authentication data pattern analysis generates non-match quality signal in case the generator challenge sequence, say ZZTTYYPPBB does not match the order of the response sequence (recorded buyer's authentication data pattern), say YYTZZPPPPBB. The T is a silent period. The P is a silent period. The YY, ZZ and BB are phrases.

An embodiment of the invention corresponds to Block 4 conveying analytics data to Block 5 through connection 11. The analytics data may comprise quality factors. The quality factors may be processed by Block 5 to generate hard buyer authentication decision. The quality factors may be processed by Block 5 to generate soft buyer authentication decision. An embodiment of the invention corresponds to Block 4 conveying to Block 5 the buyer's authentication data features for storage and further analysis.

Another embodiment of the invention corresponds to Block 5 calculating quality factors based on the buyer's authentication data features and previously stored buyer related buyer's authentication data signature information.

External Applications:

An embodiment of the invention corresponds to Block 5 conveying to an external host application the decision through connection 13 to Block 1 and through connection 7 to external applications. An embodiment of the invention corresponds to Block 5 conveying to an external host application the quality factors through connection 13 to Block 1 and through connection 7 to the external application(s). An embodiment of the invention corresponds to Block 5 conveying to an external host application a trigger for action through connection 13 to Block 1 and through connection 7 to an external application(s). The trigger for action may, for example, start an application event to open a phone client such as a voice over internet protocol client application at a buyer smartphone, and/or start a camera application for taking a picture, and/or starting a camera or a scanning application to scan a buyer finger or palm, and/or starting a video application to record a video of buyer and/or sending a message to buyer phone to act upon—such as to call a service center or to make a video call to a service center, and/or to start a call-back procedure through which a user/buyer's mobile phone is called automatically by a system or presents to user/buyer instructions to call a given phone number for real-time verification by an agent in cases where the quality factors represent a high risk transaction.

For example, the buyer answers a call at his mobile phone and responds to a challenge sequence back to the LMFP system directly or through a mediation program or service center. The LMFP system is directed to the problem of fraudulent electronic commerce transaction risk assessment by way of Block 5 processing of, but not limited to, at least one of the following user/buyer related information elements: user/buyer information posted in public records such as social networks, user/buyer related information published in public records such as blogs, user/buyer related information published in public records such as social media, user/buyer related information shared by user/buyer onto LMFP through forms, user/buyer related information shared by user/buyer onto LMFP through interactive questions and answers sessions, user/buyer related information shared by user/buyer onto LMFP through challenge responses, user/buyer related information submitted onto LMFP through customer service representatives, user/buyer related information submitted onto LMFP through point of sale program or devices and or representatives, user/buyer related information submitted onto LMFP through a gaming program or devices or platforms capable of collecting such user/buyer related information and passing it to LMFP, user/buyer related information shared by user/buyer onto LMFP through merchant's website, user/buyer related information shared by user/buyer onto LMFP through LMFP web page, user/buyer related information shared by user/buyer onto LMFP through social networks applications or pages. The user/buyer related information may, for example, comprise user/buyer related buyer's authentication data signature information.

An embodiment of the invention corresponds to Block 5 correlation of events for abnormalities detection for a specified user/buyer. For example, Block 5 correlation mechanism checks if a user/buyer posts in a social network while the user/buyer is in LMFP process. For example, the correlation mechanism checks if a user/buyer posts a location while the user/buyer is in an LMFP system process originating at another location. For example, the location can be extracted from a user/buyer mobile phone through Block 1. For example, the location can be a specific region extracted from a user/buyer originating device IP address. For example, the correlation mechanism generates a trigger to re-generate a challenge question. For example, the correlation mechanism checks time length of transaction, repetition of visiting a transaction, time lapse between repeated transaction, distribution of transaction locations, speed of movement within same transaction location area, speed of movement between different transaction location areas, and velocity of transactions. For example, correlation mechanisms assess user/buyer authenticity based on changes in one or more of the correlation elements over time, from the time prior to the transaction through the time the transaction is no longer processed.

An embodiment of the invention corresponds to Block 5 conveying to Block 6 trigger for sequence generation through connection 12. The trigger for challenge sequence generation may, for example, result in a procedure through which a user/buyer is re-challenged automatically by the LMFP system for real-time re-verification in cases the quality factors represent high risk of transaction approval. For example, a high risk transaction may be an international transaction where a buyer purchases goods from another country and or delivered to another country. For example, a high risk transaction may be a transaction of goods delivered to an address different that the address of record of buyer and/or delivered in rush or same day delivery and/or in the case of digital or virtual goods delivered or downloaded immediately.

An embodiment of the invention corresponds to Block 1 conveying to Block 5 through connection 13 a trigger to fetch a challenge sequence for the user/buyer. For example, after a user/buyer submits identification information such as, but not limited to id number and/or credit card number and/or a full name, and/or email address, Block 1 receives such information from an external host application through connection 7 and conveys the information to Block 5 through connection 13 and as a result, the Block 5 conveys to Block 6 through connection 12 a request for a new challenge sequence. The sequence is then conveyed back to Block 5 by Block 6 through connection 12 and from Block 5 to Block 1 through connection 13 and by Block 1 to external host application through connection 7. The challenge sequence is then presented to user/buyer on a screen display or through loudspeakers audibly by either Block 1 or its external host application. An embodiment of the invention corresponds to Block 6 fetching information from Block 5 database through connection 12 in order to assemble a challenge sequence. The information may correspond to the user/buyer. The information may correspond to the transaction. The information may correspond to the buyer's authentication data features. The information may correspond to the quality factors. For example, the buyer's authentication data feature may be a spoken word and/or a facial reaction and/or a gesture. The information may correspond to the pre-used challenge sequence. The information may correspond to format of challenge sequence. The format of sequence may comprise but not be limited to any number of characters, syllables, words, phrases, sentences, objects, images, video clips, animations, and any combination thereof.

An embodiment of the invention corresponds to Block 6 generating challenge sequences based in part or in whole on information fetched from Block 5. For example, the Block 5 randomly selects an object from an array of objects fetched from Block 5 and locates it within a challenge sequence. For example, Block 6 generates a sequence of random length silent periods embedded with words fetched from Block 5. For example, objects fetched from Block 5 may correspond to user/buyer related secret information. For example, Block 6 fetched from Block 5 a user/buyer location and Block 6 generates a challenge sequence such as "My current location is <fetched user location> but I live in <fetched user home address>".

An embodiment of the invention corresponds to Block 5 managing LMFP bookkeeping and process management. Another embodiment of the invention encompasses encryption buyer's authentication data features, signatures, user/buyer information and transaction information to protect data from spoofing and alteration. For example, the recorded buyer's authentication data signature is encrypted prior to storage. The management includes management of whitelists of known original users/known buyers and their information and buyer's authentication data signatures and blacklists of impostor's buyer's authentication data signatures and information. Block 5 augments buyer's authentication data signature to accumulate history data for each user/buyer and impostor. For example, the augmented buyer's authentication data signatures over time and transactions assists Block 4 and/or Block 5 improve buyer authentication performance over time.

Global Signature Bank:

An embodiment of the invention corresponds to Block 5 managing a global buyer's authentication data signature bank for any merchant that implements a connection through Block 1 and connection 7. The buyer's authentication data signature bank is unique by comparison to state-of-the-art recognition systems in that it creates a reference signature data across merchants' walls and enables reuse of the data. For example, some existing identification systems are implemented for a specific enterprise contact center. Their collected buyer's authentication data signatures do not serve to detect imposters in other enterprises. By contrast, the invention allows for an imposter of a transaction of merchant WQ to be detected in a transaction of another merchant QA at another time because the data exists in the global signature bank. For example, such a process is known as crowdsourcing of user/buyer related identity information. A merchant or an external application can notify the LMFP system through Block 1 and connection 7 that an identity has been compromised by an impostor. This may be crowd sourced or done proactively. Such notification is then conveyed to Block 5 through connection 13. Block 5 updates attributes of the identity with a red flag. Block 5 updates the blacklists of the impostor's data signature. During an identity check, if it is a first time ID, Process 9 of FIG. 2 may access Block 5 of FIG. 1 blacklists to detect if same media features are associated with a known impostor and update Block 5 in Process 17. During an identity check, if it is not a first time ID, Process 10 of FIG. 2 may access Block 5 ID red flags and blacklists to detect if same media features are associated with a known impostor and/or identity had been compromised. Processes 11 and on of FIG. 2 deal with challenging a user again in those situations. Block 5 reports back to Block 1 and to an external application by means of the transaction quality factor and/or trust factor if the authentication failed and/or identity is compromised. The global signature bank of Block 5 ensures that any identity that is recorded and any impostor that is recorded can serve to authenticate users or buyers regardless of the time and origin of data signatures (e.g. a person proactively surrenders his media ID characteristics to the LMFP system to become protected against identity theft, a merchant reports a chargeback to protect itself from same fraudster and to alert other merchants and users of identity theft).

Gamification and Apps:

For example the present invention's LMFP system collects user/buyer identity information through games or applications that interact with users through a microphone and/or a camera. One embodiment of the invention encompasses identity related information collection through a game that presents to users a challenge sequence in the form of a request to act upon a word, and/or an image, by speaking back a definition of the word or phrase or image. The user/buyer response is recorded in Block 2 and kept as reference identifying information of the user/buyer in Block 5. The user/buyer response may also be analyzed for correctness. For example, if a challenge was to define a phrase without using certain words, the LMFP system, Block 6 by interrogating Block 5, may generate a response sequence if a user used a forbidden word—a.k.a. a taboo game. For example the LMFP system may use such gamification to interact with users to collect their identifying information in a fun and entertaining way. For example, such one entertaining way of collecting user related identification information is by challenging users to react to a challenge by motion only, without speaking, a.k.a picture it or draw it. The user reaction may be collected and/or recorded through a camera and/or a microphone and/or a touch screen and/or a keyboard and/or similar input means or devices into Block 1. The LMFP system associates an identity with a game stored in Block 5. Every time there is a need to challenge a user, the LMFP system fetches a proper challenge sequence based on the game and stage and/or credits accumulated as registered by Block 5 for the specific user's identity. An external application may communicate to Block 5 through Block 1 and connections 7 and 13 game outline, rules, stages and credits for a specific user identity.

One embodiment of the invention encompasses the gamification of user identifying information collection process as a separate or disconnected process in time and/or in location. For example, the gamification may encourage users to participate in the game and contribute their identifying information through the game by allowing users to score points or earn difficulty levels. For example the gamification of the identification information collection process may comprise sharing of user responses and/or scores and/or level of difficulty and/or earned points and/or earned Bitcoins® with other users. For example, the sharing may be done through social networks such as Facebook®. For example the gamification encourages new users to join games by rewards. For example, incentive rewards may be merchant rewards delivered to users through LMFP.

Figure 2:
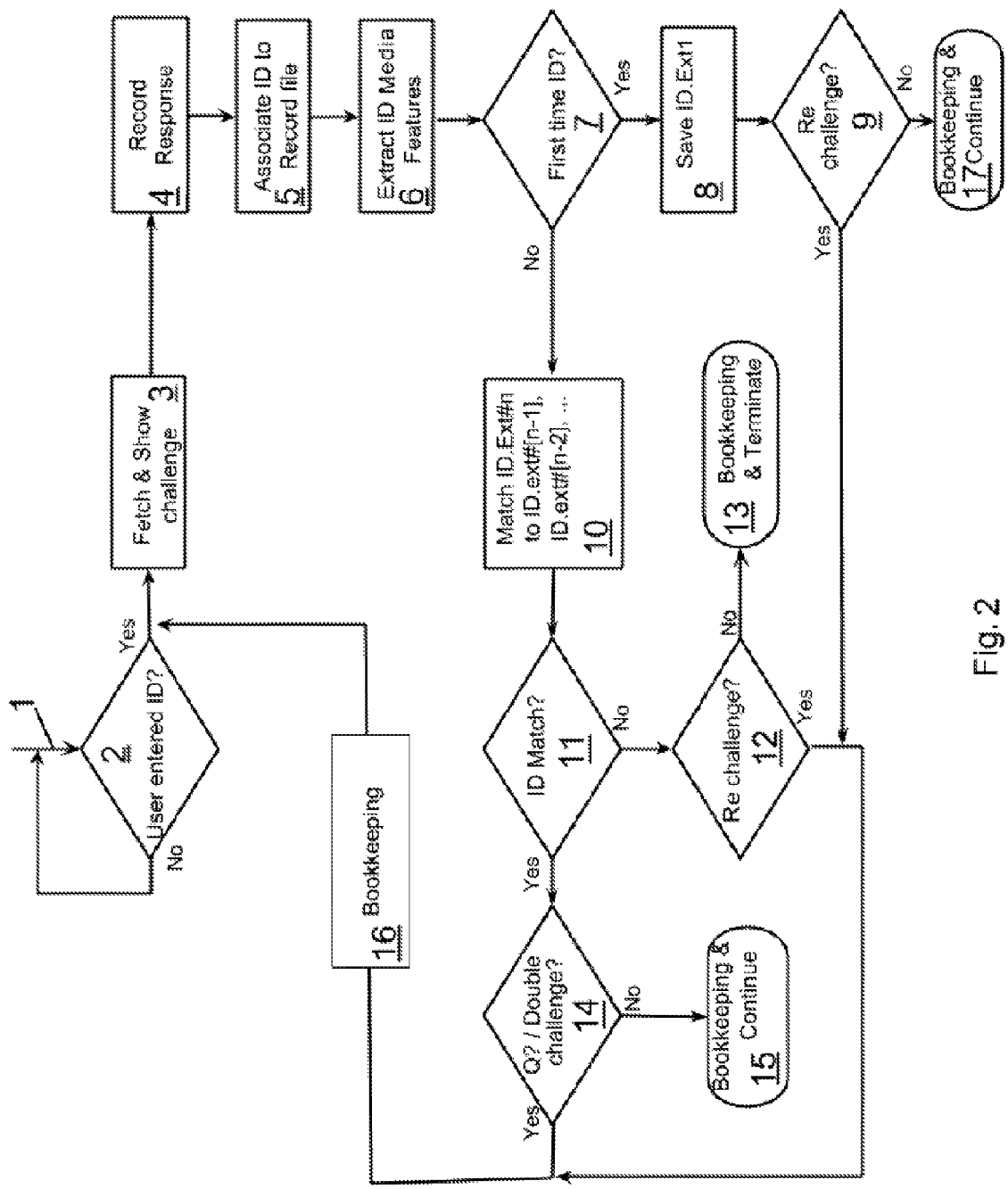
FIG. 2 is a flowchart diagram presenting buyer authentication process in accordance with one embodiment of the present invention.
Figure 3:
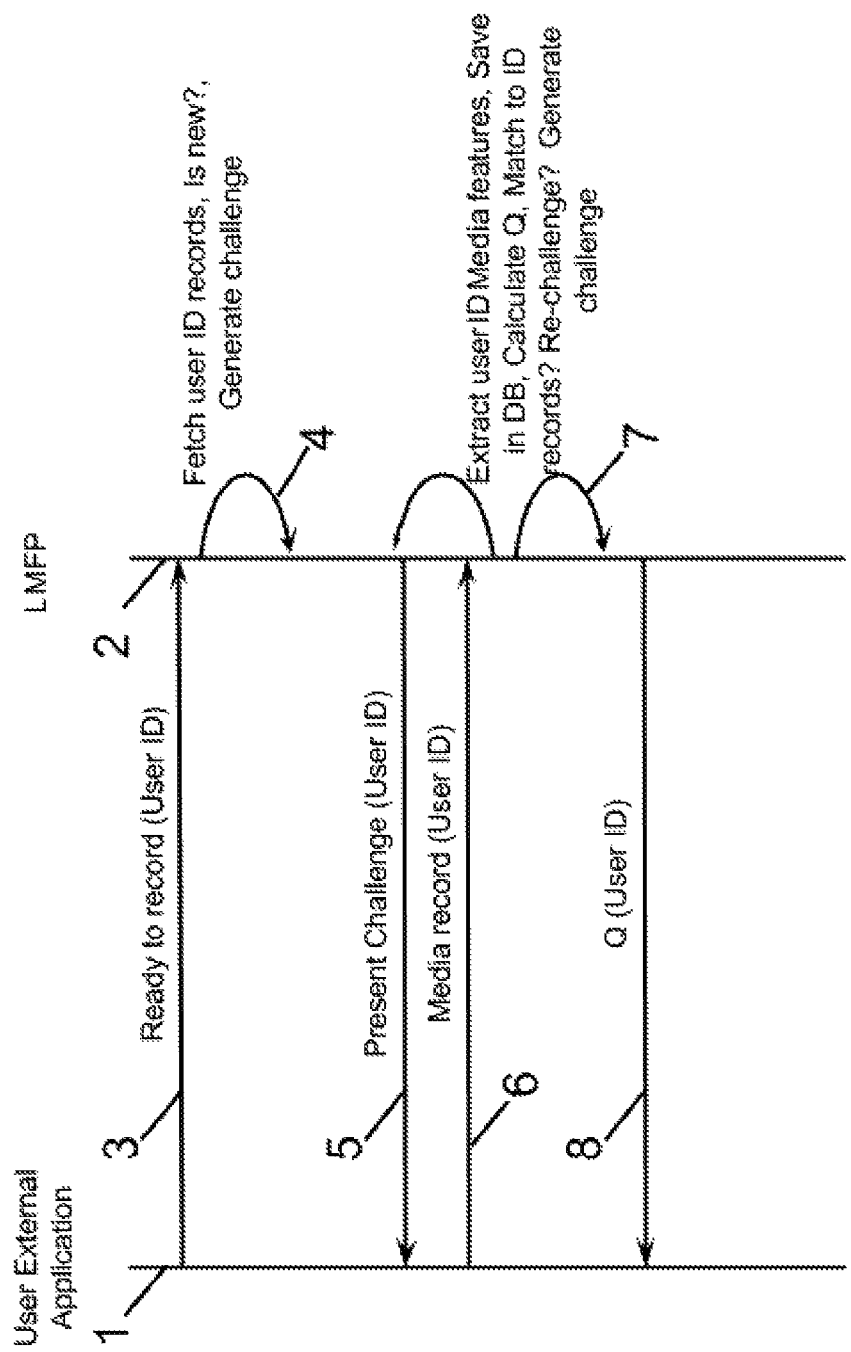
FIG. 3 is a use-case scenario chain of events UML diagram in accordance with one embodiment of the present invention.
Figure 4:
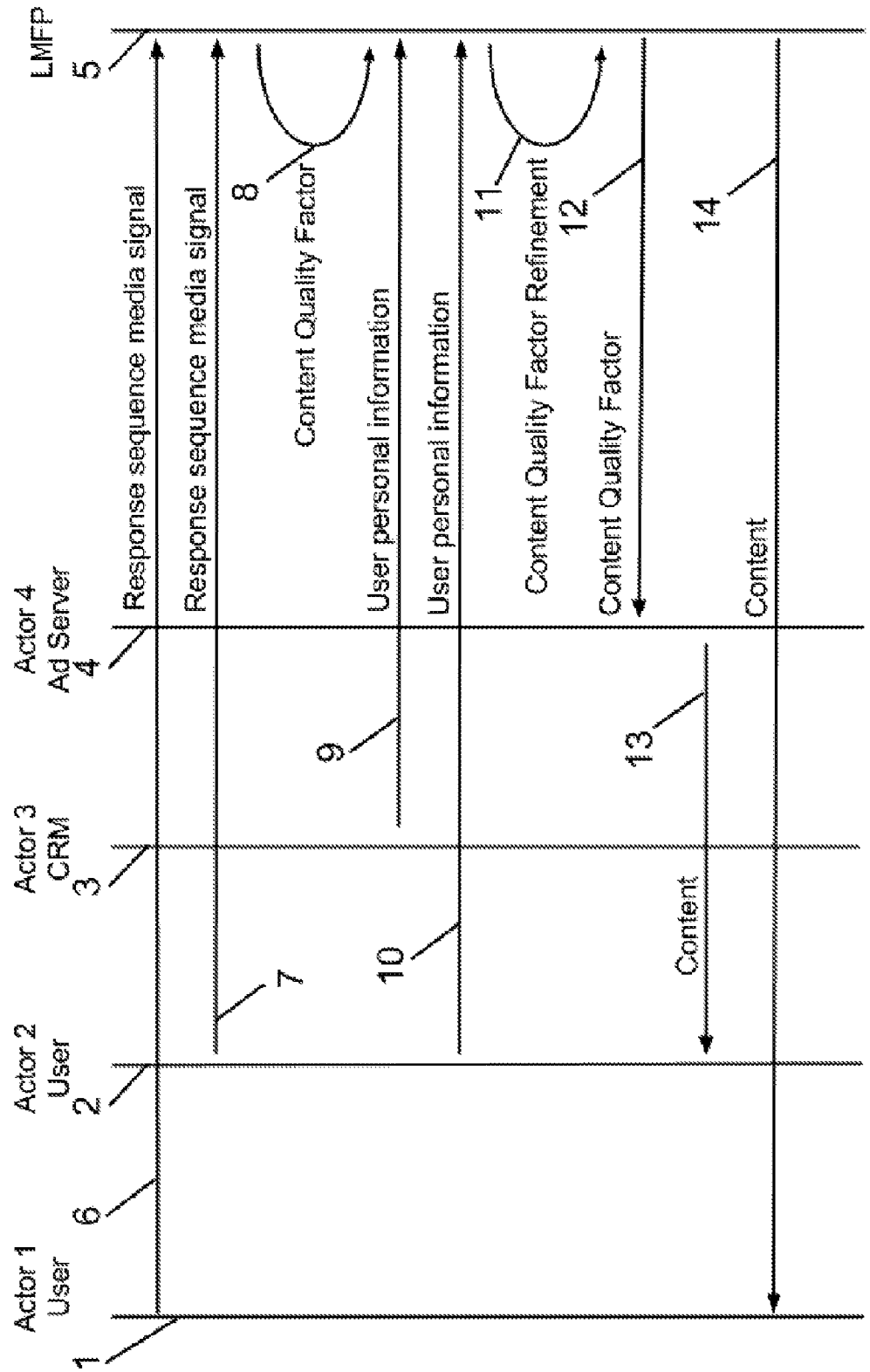
FIG. 4 is a chain of events control UML diagram presenting an advertisement serving use-case in accordance with one embodiment of the invention.

Reports:

For example, the process management and bookkeeping is presented in FIGS. 2, 3 and 4. An embodiment of the invention corresponds to Block 5 generating an audit trail of all transactions, all users and all actions by time, actions and actors of each action. An embodiment of the invention corresponds to Block 5 generating statistical analysis data, by any attribute of a transaction buyer authentication, such as but not limited to, time periods, users, actions, transactions, locations, quality factors, buyer's authentication data features, spoken words, facial and gesture reactions, challenge sequences, channel types and game features and responses, scores, rewards and similar measurements of LMFP, or any of its sub processes or programs. For example, Block 5 may generate a report to assist in detecting fraud attacks originated at a specific territory. For example, the report may be produced for a specific source device, say a specific mobile phone. For example the report may be of a specific gamer/user/buyer. The report may comprise game statistics such as highest scorers and/or most used features of games. The report may be conveyed by Block 5 to Block 1 through connection 13 and then to external applications through Block 1 and connection 7.

An embodiment of the invention corresponds to Block 5 generating quality factors based on the statistical analysis data. An embodiment of the invention corresponds to Block 5 generating advertising content based on the statistical analysis data. For example, the advertising content may be a coupon to a singer performance if Block 5 detects that a spoken challenge sequence was "My favorite singer is <user generated content> and I would love to go to his/her performance if it's nearby." and, Block 5 detects that user/buyer location is where the singer <user generated content> is 5 times out of 6 the name of a singer that will have a performance shortly.

Machine Fraud Detection:

An embodiment of the invention encompasses a re-challenging mechanism to combat first time machine masquerade through random sequencing of challenges. For example, if a machine or a program is impersonating a first time buyer, it will be rebutted with a random sequence or sequences that are impossible or hard to fake without the notice of Block 5 and/or Block 4. The challenge sequences may comprise objects such as an image or a movie that are hard or impossible to process in real-time by impostor machines.

An embodiment of the invention corresponds to Block 5 receiving from Block 1 through connection 13 a request to re-classify buyer identity for a specified transaction and perform the reclassification. For example, a new user's buyer's authentication data signature is registered in Block 5 whitelist for the first transaction user/buyer makes. The buyer's authentication data signature may serve as a reference signature for following transactions of the user/buyer. However, if the user/buyer is an impostor, the transaction will be rejected post mortem by the credit card company and/or manual risk assessment team and/or automatic risk assessment algorithms or programs or system and/or after a complaint had been filed by the original credit card holder/owner. Merchant may then log into the LMFP system through Block 1 and ask to move the buyer's authentication data signature from the whitelist to the blacklist and flag the transaction as fraudulent and add information of the impostor and Block 5 will store all related information to the fraudulent transaction and the impostor.

An embodiment of the invention comprises all blocks of the LMFP system co-located with the user/buyer. Another embodiment of the invention comprises the blocks of the LMFP system as a distributed element partly dislocated from user/buyer location. One embodiment of the invention encompasses conveyance of user/buyer information required for automatic population of PCI certified express checkout document that allows for a one-click checkout process in a payment processing session. For example, when the user clicks on an online checkout button or express checkout button or a similar meaning button, the LMFP system will present to the user/buyer directly, or through a proxy of a hosting application, a challenge sequence, then collect the user/buyer response sequence, analyze the response, calculate at least one quality factor and if the quality factor or factors comply with some predefined or adaptive threshold or thresholds for positive authentication of known user/buyer, collect all relevant user information and transactional data and populate and submit electronic form or forms or documents necessary to fulfil a payment transaction.

Buyer Authentication Process

FIG. 2 is a flowchart diagram presenting computer steps of the LMFP system of FIG. 1 in a buyer authentication process in accordance with one embodiment of the present invention. A transaction may be started at point 1, where an external application sends a trigger to start a widget or a java script program or html5 code or similar procedure and convey to it some user/buyer identification data, such as id number, full name, email address, credit card number, last few digits of a credit card number and full name and any combination thereof.

Decision point 2 of Block 1 of FIG. 1 acknowledges the user/buyer id uniqueness and conveys to Block 5 of FIG. 1 (e.g. LMFP database) a request to fetch a challenge sequence. Block 1 at step 3 presents to user/buyer through external host application the fetched channel sequence. User/buyer responds to the challenge sequence which is collected by Block 1 (FIG. 1, API) and recorded by Block 2 (FIG. 1, Recorder) at step 4. Block 2 associates user/buyer and transaction id to recorded buyer's authentication data file at step 5 and moves the recorded file to Block 3 (FIG. 1, Features Extraction). Block 3 extracts buyer's authentication data features and Block 4 (FIG. 1, Pattern Analysis) and Block 5 (FIG. 1, database) analyze the buyer's authentication data features, in step 6. Step 7 checks against Block 5 database if it is a first time user/buyer. If yes, step 8 saves the extracted information for user/buyer id in Block 5.

Block 5 may decide in step 9 to acknowledge the transaction, and make all necessary bookkeeping in step 17 and report quality factors to external applications; or it may start a re-challenge process at step 9, arbitrarily or based on non-definitive quality factors. For example, a user/buyer stress factor may be alerting. For example, a machine generated sequence is detected for abnormal phrase pronunciation and/or motion and/or facial expression or gesture response that generates bad quality factors. If a re-challenge sequence is started, Block 5 communicates with Block 6 (FIG. 1, Challenge Generator) and Block 1 to convey a new challenge to user/buyer through connection 7 and the host external application.

Block 5 carries all the relevant bookkeeping at step 16. If it is not a first time user, step 10 uses history data of specific user/buyer to generate quality factor, Block 4 pattern analysis and Block 5 database. Point 11, Block 5, assesses if there is a match between the current user/buyer and the buyer's authentication data signature history data of the user/buyer. If there is a match, then at step 14, Block 5 decides if to re-challenge user/buyer and actions of step 9 are repeated. If there is no match at step 11, then Block 5 decides if to terminate the transaction and notify the external application of an impostor at step 13, or to re-challenge, and go to step 16. For example, the decision may be arbitrary or based on a quality factor marginality. At step 14, Block 5 may decide to re-challenge, go to step 16 or report successful transaction authentication to host external application through Block 1 and do the bookkeeping, step 15.

Challenge Sequence Process

FIG. 3 is a use-case scenario chain of events diagram in accordance with one embodiment of the present invention, and as discussed in FIG. 2. Actor 1 is an external application. Actor 2 is an LMFP system. Event 3, Actor 1 reports to Actor 2 to authenticate a user/buyer by id info. Actor 2 searches if user/buyer id is new. Actor 2 generates challenge sequence, Event 4. Event 5, Actor 2 sends challenge to Actor 1 to present to user/buyer. Event 6, Actor 1 conveys to Actor 2 voice and/or still picture of and/or motion picture of and/or a video of a face and/or an object or objects or items and/or picture/or scan of iris or a finger or fingers or palm to be recorded for the user/buyer id. Event 7, Actor 2 analyses voice and/or still picture of and/or motion picture of and/or a video of a face and/or an object or objects or items and/or picture/or scan of iris or a finger or fingers or palm recording, extract features, saves in database, calculates quality factors, and assesses if to re-challenge. If re-challenged, then Actor 2 generates a challenge sequence and goes back to Event 5. Otherwise, Actor 2 reports to Actor 1, Event 8, quality factor for the transaction and the user/buyer id.

Two Different Buyers, Each Conducting a Transaction

FIG. 4 is a chain of events control diagram presenting an advertisement serving use-case in accordance with one embodiment of the invention. For example, Actor 1 is a user, buyer. Actor 2 is a user, another buyer. Actor 3 is a customer relationship management system, CRM. CRM may hold user/buyer related information. Actor 4 is an Advertisement Server (Ad Server) that may hold advertising information and provide advertising ability. Actor 5 is a LMFP system. Events 6 and 7 deliver to Actor 5 buyer's authentication data of two different buyers, each conducting a transaction. For example both users conduct transactions with the same merchant.

The LMFP system can retrieve buyer information on their interests either directly from the buyer or the CRM. Event 8, Actor 5 computes a quality factor that resembles users' interest in content. Event 9, Actor 5 fetches information of Actor 1 from Actor 3. Event 10, Actor 5 receives information of Actor 2 from Actor 2.

Event 11, Actor 2 generates a refined quality factor based on update events 9 and 10 and original event 8. Actor 2 delivers quality factor to Actor 4, event 12. Actor 4 serves content to Actor 2, Event 13. Actor 5 serves content to Actor 1, Event 14. For example, the event 14 may be used to convey an advertisement to Actor 1 by means of a new challenge sequence. For example, Actor 5 generates a challenge sequence as follows "Researchers found that intake of vegan omega 3 extracted from *Salvia Sclarea* yields better results than fish omega 3".

CONCLUSION

The various embodiments of the present invention may also be in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions.

A number of implementations have been described. Nevertheless, it will be understood that various modifications may be made, such as the implementation of the LMFP in other industries and areas besides eCommerce, such as banking, For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computerized method for generating a new signature of a user to prevent user impersonation, comprising a computer processor steps of,
   a. fetching a signal from a non-volatile memory of at least one portion of at least one previously generated user's signature;
   b. generating at least one challenge sequence based on the signal to create a new signature;
   c. presenting the generated challenge sequence to the user;
   d. collecting the user's challenge response to the generated challenge sequence, and further comprising an events correlation mechanism that checks for use abnormalities of a user and generates a trigger to re-generate a challenge question if an abnormality is detected, wherein the abnormality comprises one or more of: conflicts in a user's known location, current activity, time length of transaction, repetition of visiting a transaction, time lapse between repeated transaction, distribution of transaction locations, speed of movement within same transaction location area, and speed of movement between different transaction location areas;
   e. computing a quality factor which represents a degree of correlation between any portion of the user's challenge response and any portion of the generated challenge sequence;
   f. generating a new signature based on any portion of user's challenge response and any portion of the previously generated signature and any portion of collectable information from user's device memory;
   g. storing the new signature and at least one of, the quality factor, a trust factor or a transaction quality factor in a non-volatile memory or communicating it to a computer program; and,
   h. wherein each challenge sequence and challenge response comprises any combination of one or more of textual, visual effects of display, picture, moving picture, video, audio, animation, advertisement format, computer code, and computer data objects.

2. The computerized method of claim 1, wherein the trust factor or the transaction quality factor comprises computing a degree of correlation between any portion of the user's challenge response and any portion of a previously generated signature and any portion of collectable information from the user's device memory.

3. The computerized method of claim 1, wherein generating a new signature is further based on information collected from memory of at least one user device.

4. The computerized method of claim 1, wherein generating a new signature on, or adjacent to, every user interaction, or an external application interaction, or a predefined schedule or trigger event is based on any portion of location, device unique parameters, unique program identifier, unique device identifier, user identifying information, and user related information fetched from memory of at least one user device.

5. The computerized method of claim 1, wherein generating a new trust factor or transaction quality factor on, or adjacent to, every user interaction, or an external application interaction, or a predefined schedule or trigger event is based on any portion of location, device unique parameters, unique program identifier, unique device identifier, user identifying information, or user related information fetched from memory of at least one user device.

6. The computerized method of claim 1, wherein the trust factor or the transaction quality factor is a cross platform transaction quality factor related to at least two computer programs the user interacts with through at least one device.

7. The computerized method of claim 1, wherein a content quality factor reflects a user's interest in an advertisement that may be presented to user by incorporation within a challenge sequence or by controlling content presented to the user.

8. The computerized method of claim 1, wherein any of the quality factor, the trust factor, the transaction quality factor and a content quality factor may be communicated to at least one computer program at any time.

9. A networked based computing system for detecting fraudulent machine or human impersonation of a user, comprising:
  a) a system computer comprising at least one processor and at least one memory device operably connected to one another, and a plurality of computer-executable instructions stored on the memory device that when executed by the processor, cause the processor to:
    i. fetch a signal from a non-volatile memory of at least one portion of at least one previously generated user's signature;
    ii. generate at least one challenge sequence based on the signal to create a new signature;
    iii. present the generated challenge sequence to the user;
    iv. collect the user's challenge response to the generated challenge sequence, wherein the generated challenge sequence and the user's challenge response comprises any combination of one or more of textual, visual effects of display, picture, moving picture, video, audio, animation, advertisement format, computer code, and computer data objects,
    v. check for use abnormalities of a user and generate a trigger to re-generate a challenge question if an abnormality is detected, wherein the abnormality comprises one or more of: conflicts in a user's known location, current activity, time length of transaction, repetition of visiting a transaction, time lapse between repeated transaction, distribution of transaction locations, speed of movement within same transaction location area, and speed of movement between different transaction location areas;
    vi. compute a quality factor which represents a degree of correlation between any portion of the user's challenge response and any portion of the generated challenge sequence;
    vii. generate a new signature based on any portion of the user's challenge response and any portion of the previously generated signature and any portion of collectable information from the user's device memory;
    viii. store the new signature and at least one of, the quality factor, a trust factor, and a transaction quality factor in memory or communicating it to a computer program; and,
  b) a connection between the system computer and one or more external applications.

10. The networked based computing system of claim 9, wherein the trust factor or the transaction quality factor comprises computing a degree of correlation between any portion of the user's challenge response and any portion of a previously generated signature and any portion of collectable information from the user's device memory.

11. The networked based computing system of claim 9, wherein generating a new signature is further based on information collected from memory of at least one user device.

12. The networked based computing system of claim 9 wherein generating a new signature on, or adjacent to, every user interaction, or an external application interaction, or a predefined schedule or trigger event is based on any portion of location, device unique parameters, unique program identifier, unique device identifier, user identifying information, and user related information fetched from memory of at least one user device.

13. The networked based computing system of claim 9 wherein generating a new trust factor or transaction quality factor on or adjacent to every user interaction, or an external application interaction or a predefined schedule or trigger event is based on any portion of location, device unique parameters, unique program identifier, unique device identifier, user identifying information, and user related information fetched from memory of at least one user device.

14. The networked based computing system of claim 9, wherein the trust factor or the transaction quality factor is a cross platform transaction quality factor related to at least two computer programs the user interacts with through at least one device.

15. The networked based computing system of claim 9, wherein a content quality factor reflects a user's interest in an advertisement that may be presented to user by incorporation within a challenge sequence or by controlling content presented to user.

16. The networked based computing system of claim 9, wherein any of the quality factor, the trust factor, the transaction quality factor and a content quality factor may be communicated to at least one computer program at any time.

17. A networked based computing system for detecting fraudulent machine or human impersonation of a user, comprising:
  a) a system computer comprising at least one processor and at least one memory device operably connected to one another, and a plurality of computer-executable instructions stored on the memory device that when executed by the processor, cause the processor to:
    i. fetch signals from memory of at least one portion of any two or more of the following: a previously generated user's signature, a previously generated challenge sequence, a user's identifying information, a user's related information, a user's device identifying information, a user's device location, a user's device parameters, a user's challenge response, a quality factor, a trust factor, a transaction quality factor, a content quality factor, a whitelist, a blacklist, an advertisement, a content object, a user's behavior information;
    ii. generate at least one new signature on, or adjacent to, every user interaction, or an external application interaction, or a predefined schedule or trigger event based on the signals;
    iii. store the new signature in memory or communicate it to a computer program;
    iv. generate at least one challenge sequence based on the signals;
    vi. present the generated challenge sequence to a user, in one of visual, audible or audiovisual format;
    vii. collect a user's challenge response to the generated challenge sequence, and check for use abnormalities of a user and generate a trigger to re-generate a challenge question if an abnormality is detected, wherein the abnormality comprises one or more of: conflicts in a user's known location, current activity, time length of transaction, repetition of visiting a transaction, time lapse between repeated transaction, distribution of transaction locations, speed of movement within same transaction location area, and speed of movement between different transaction location areas;

viii. compute on or adjacent to every user interaction, or an external application interaction or a predefined schedule or trigger event, any of a quality factor which represents a degree of correlation between any portion of the user's challenge response and any portion of the generated challenge sequence, a trust factor which represents a degree of quasi-continuous authenticity certainty, a transaction quality factor which represents degree of acceptance or rejection of an online transaction, a content quality factor which represents the degree of a user's interest in content presented to the user, a whitelist which represents legitimate users, and, a blacklist which represents impostors or non-legitimate users;

ix. store in memory at least one of, the challenge sequence, the challenge response, the quality factor, the trust factor, the transaction quality factor, the content quality factor, the whitelist and the blacklist or communicate it to a computer program; and, b) a connection between the system computer and one or more external applications.

18. The system of claim 17, wherein the trust factor or the transaction quality factor are a cross platform transaction quality factor related to at least two computer programs the user interacts with through at least one device.

19. The system of claim 17, further comprising causing the processor to:

i. any one of generate, fetch from memory, receive from the external applications at least one content object or the advertisement related to the content quality factor; and, ii. present the content object or the advertisement to the user, in one of visual, audible or audiovisual format.

* * * * *